United States Patent [19]

Ichida et al.

[11] Patent Number: 4,669,428

[45] Date of Patent: Jun. 2, 1987

[54] INTAKE MANIFOLD FOR MULTI-CYLINDER INTERNAL COMBUSTION ENGINES

[75] Inventors: Katsumi Ichida, Tokyo; Hideyo Miyano; Shigeru Suzuki, both of Saitama, all of Japan

[73] Assignee: Honda Giken Kogyo Kabushiki Kaisha, Tokyo, Japan

[21] Appl. No.: 647,713

[22] Filed: Sep. 5, 1984

[30] Foreign Application Priority Data

Sep. 8, 1983 [JP] Japan ................. 58-165804
Sep. 8, 1983 [JP] Japan ................. 58-165805
Dec. 27, 1983 [JP] Japan ................. 58-248657

[51] Int. Cl.⁴ ............................................. F02B 75/22
[52] U.S. Cl. ........................ 123/52 MB; 123/52 MV
[58] Field of Search ......... 123/52 M, 52 MB, 52 MC, 123/ 52 MV

[56] References Cited

U.S. PATENT DOCUMENTS

| 4,170,203 | 10/1979 | Congram et al. | 123/52 MV |
| 4,440,120 | 4/1984 | Butler | 123/52 MV |
| 4,446,823 | 5/1984 | Bessho | 123/52 MB |
| 4,515,115 | 5/1985 | Okubo | 123/52 MB |
| 4,590,895 | 5/1986 | Yada et al. | 123/52 MB |

FOREIGN PATENT DOCUMENTS 891339 9/1953 Fed. Rep. of Germany ........ 123/52 MB

*Primary Examiner*—Craig R. Feinberg
*Attorney, Agent, or Firm*—Lyon & Lyon

[57] ABSTRACT

An intake manifold for an internal combustion engine wherein individual intake passages communicate between an air distribution chamber and each engine cylinder. Separate bypass passages extend from the distribution chamber and each intake passage at a downstream location to provide a substantially shorter effective passage to the engine cylinders and a valve in each bypass passage is operated in response to engine speed to open the bypass passages at high engine speeds.

27 Claims, 16 Drawing Figures

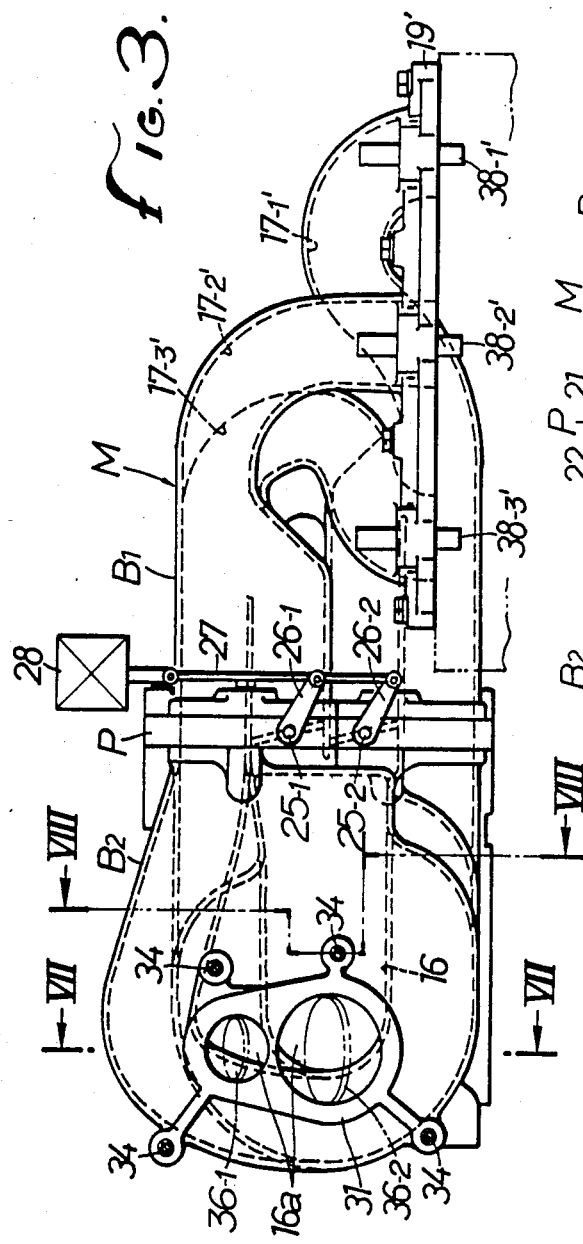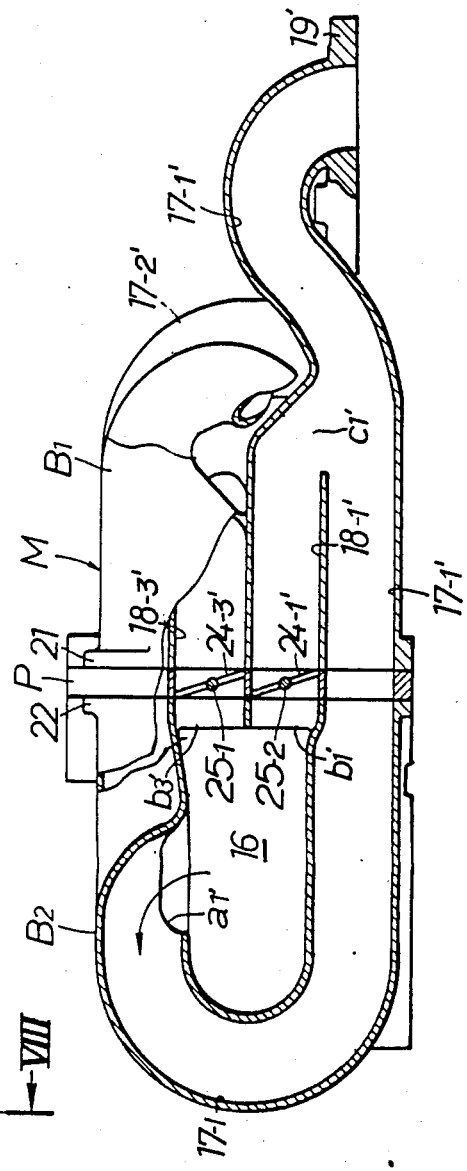

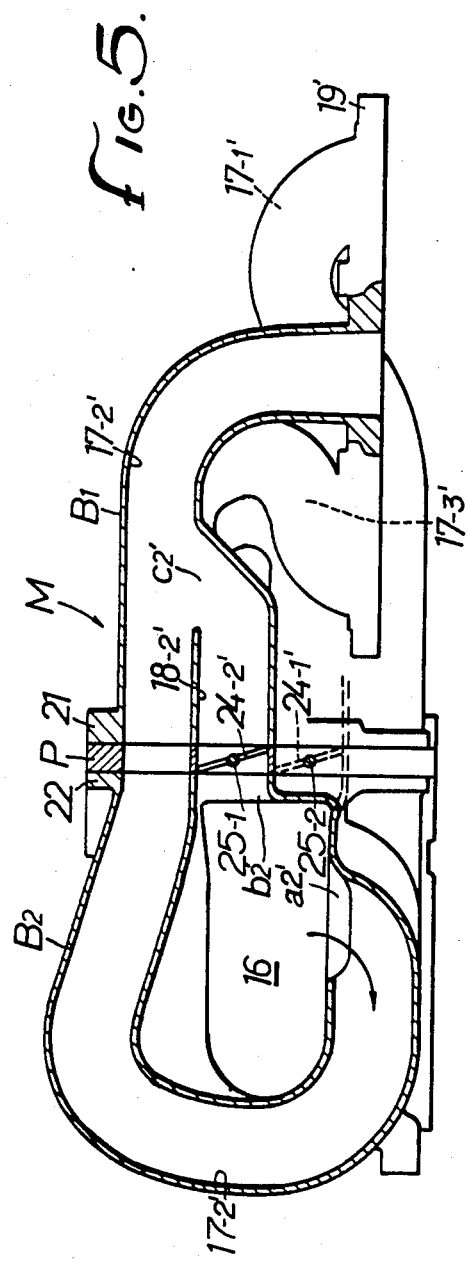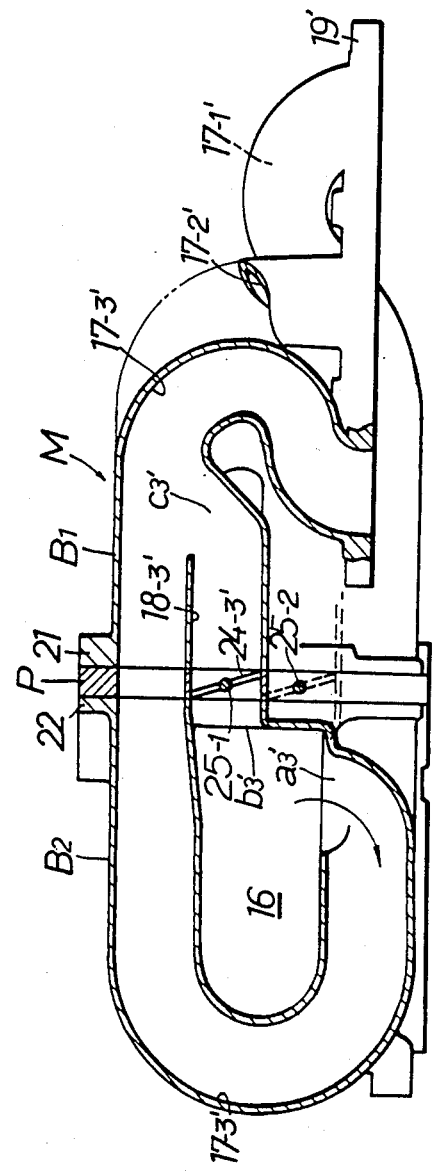

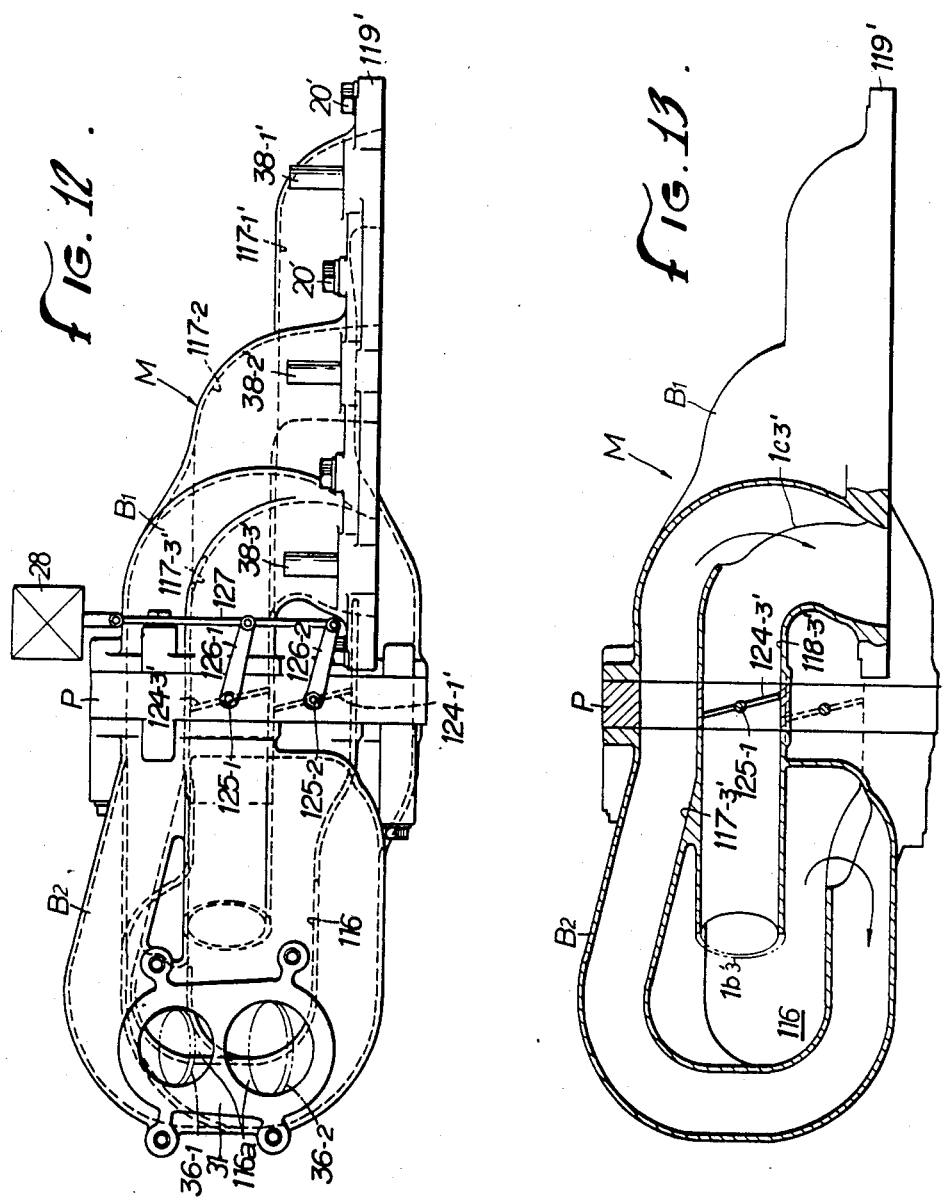

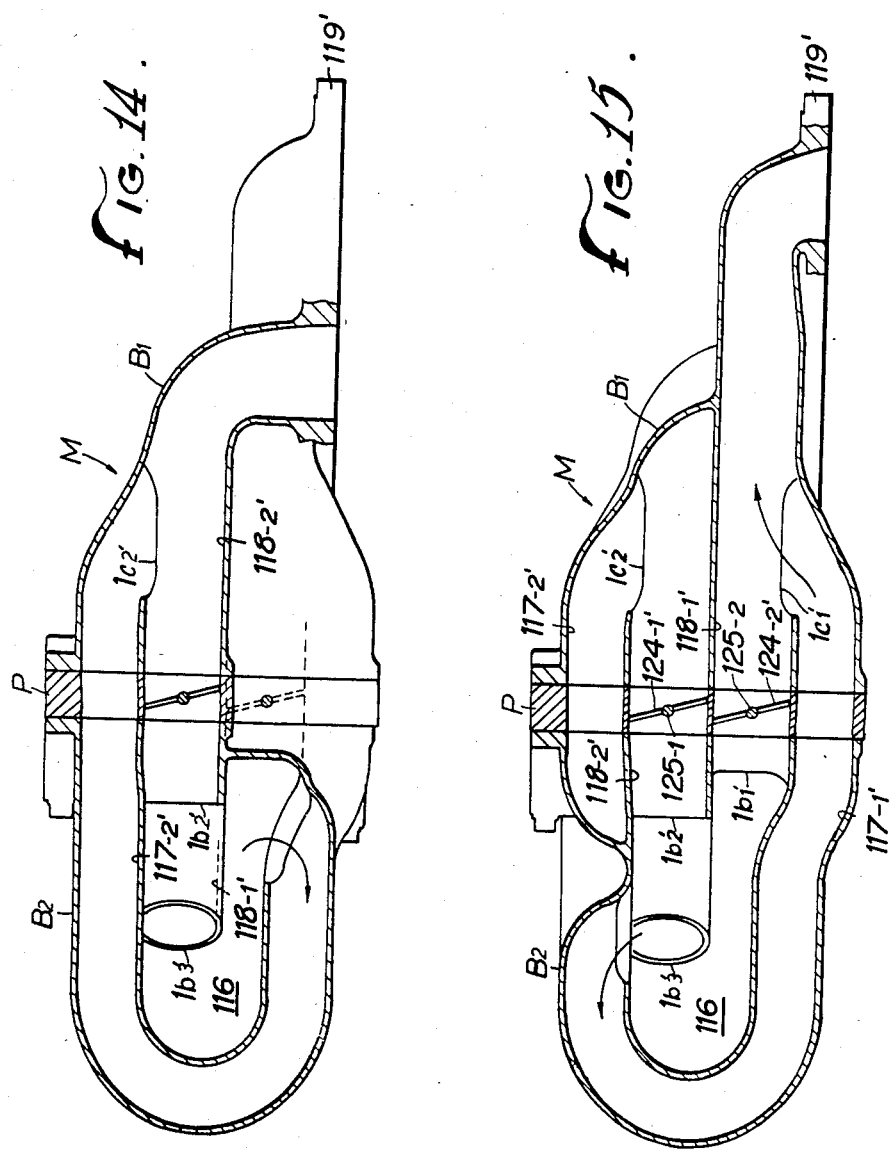

INTAKE MANIFOLD FOR MULTI-CYLINDER INTERNAL COMBUSTION ENGINES

The present invention relates to an intake manifold for a multi-cylinder internal combustion engine and, in some respects but not all, is particularly adapted for a V-shaped engine in which a pair of cylinder rows each having a plurality of cylinders arrayed in the axial direction of a crankshaft are arranged in the shape of letter "V".

There are intake manifolds for V-shaped engines known in the prior art, such as is disclosed in Japanese Patent Publication No. 52-16527, for example, wherein a plurality of intake passages are given predetermined lengths by arranging an intake distribution chamber above the valley between the two cylinder rows and by extending the intake passages obliquely downward from the intake distribution chamber to connect them to the individual cylinder rows. In that construction arrangement, however, the overall height of the engine is increased by the distribution chamber to such an extent that the hood of the engine compartment of the automobile has to be at a relatively high level which is not desirable for the aerodynamic characteristics of the automobile. This creates a disadvantage even if the V-shaped engine otherwise has a relatively small height.

It is well known in the art that the performance of an internal combustion engine can be improved by the use of intake ducts to each cylinder of a predetermined length, size or shape for a given speed of operation of the engine. Also there have been intake manifolds proposed that have adjustable or alternate lengths of intake ducts to improve engine operation at more than one speed. Representative intake manifold arrangements of this type are shown in U.S. Pat. Nos. 2,801,620; 2,835,235; 2,894,497; 2,947,294; 3,814,069; and 3,945,349 but each has certain disadvantages that are overcome by the present invention.

The present invention has an object to provide an intake manifold of the aforementioned type, which has individual intake passages with sufficient lengths for improving engine performance without increasing the overall height of the engine too much. Specifically, this invention is characterized by an intake manifold structure comprising a plurality of independent intake passages connected to intake ports which lead to the cylinders of the individual cylinder rows such that the passages merge into one another in a valley defined by the two cylinder rows and extend outwardly of said valley parallel to the crankshaft and an intake distribution chamber is juxtaposed to said valley and opens into the individual intake passages.

Another object of this invention is to provide an effective and compact intake manifold system in which the intake conduit length is automatically changed in accordance with the speed of the engine to enhance the air charging efficiency resulting from the inertial effect of the intake air at both slow and fast engine speeds. A still further object of this invention is to provide such an intake manifold system wherein there is a separate intake conduit to each cylinder and a bypass valve with each conduit for selecting either of two predetermined lengths and shapes of intake conduit for slow or fast speed operation.

Other and more detailed objects and advantages of this invention will appear from the following description and the accompanying drawings wherein:

FIG. 3 is a side elevation view of the intake manifold system taken in the direction of the arrow III shown in FIG. 2.

FIGS. 4, 5 and 6 are sectional side views of the intake manifold system taken substantially on the Lines IV—IV, V—V and VI—VI, respectively, in FIG. 2 and illustrating three of the separate intake conduits.

FIG. 12 is a side elevation view of the second embodiment of the intake manifold system.

FIGS. 13, 14 and 15 are sectional side views of the second embodiment taken substantially on the Lines XIII—XIII, XIV—XIV and XV—XV, respectively, in FIG. 11.

The present invention will be described in relation to the two embodiments illustrated and in connection with a V-shaped engine although it is to be understood that many advantages of the present invention are also applicable to in-line or other shaped engines. To the extent the components are identical in the two embodiments the same numerals and letters will be used to identify them and they will only be described with respect to the first embodiment. With respect to any components in the two embodiments that are similar but not identical, in the second embodiment numerals in the 100 series will be used for ease of understanding the relationship between the embodiments.

Figure 1:
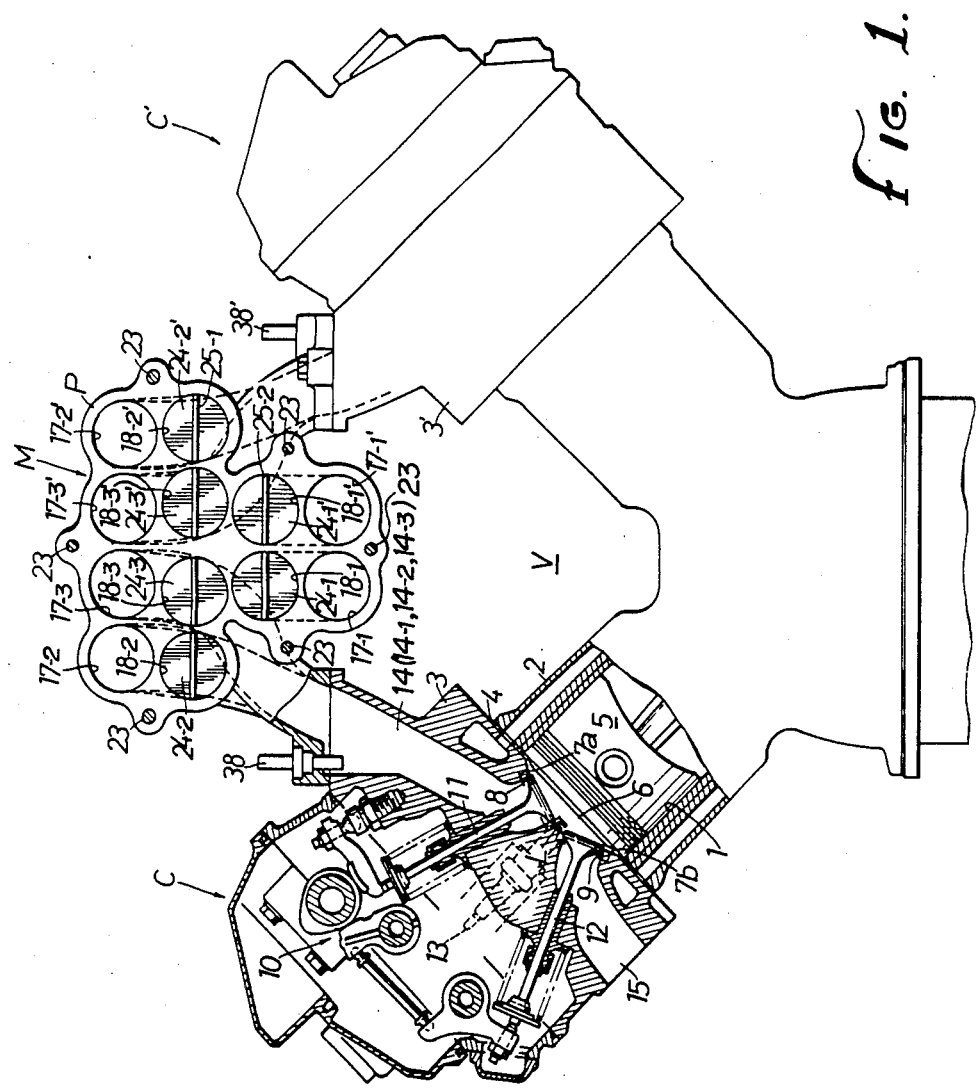
FIG. 1 is a front elevation view, taken substantially on the Line I—I in FIG. 2, of a V-shaped engine with portions in section and illustrating one embodiment of the intake manifold of this invention.
Figure 10:
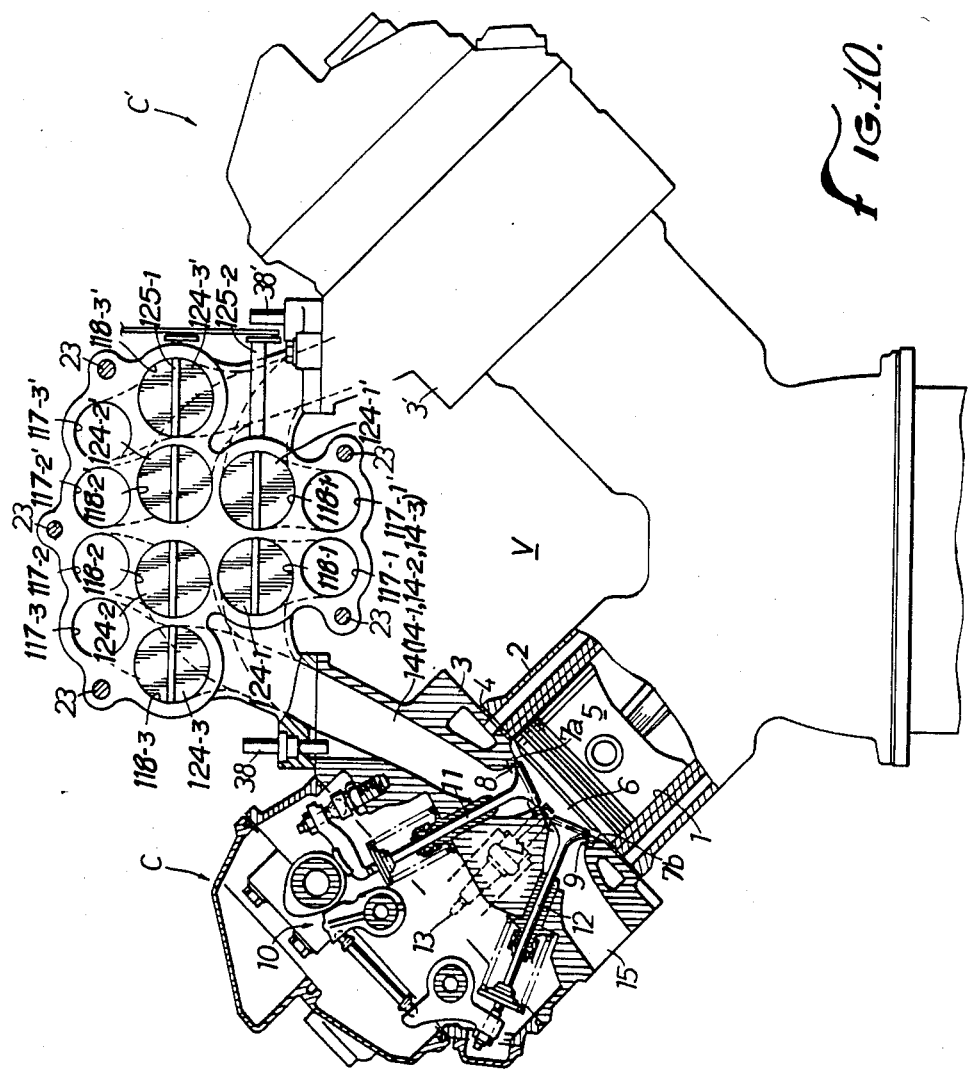
FIG. 10 is a front elevation view similar to FIG. 1, taken substantially on the Line X—X in FIG. 12, illustrating a second embodiment of this invention shown in FIGS. 10 through 16.
Figure 11:
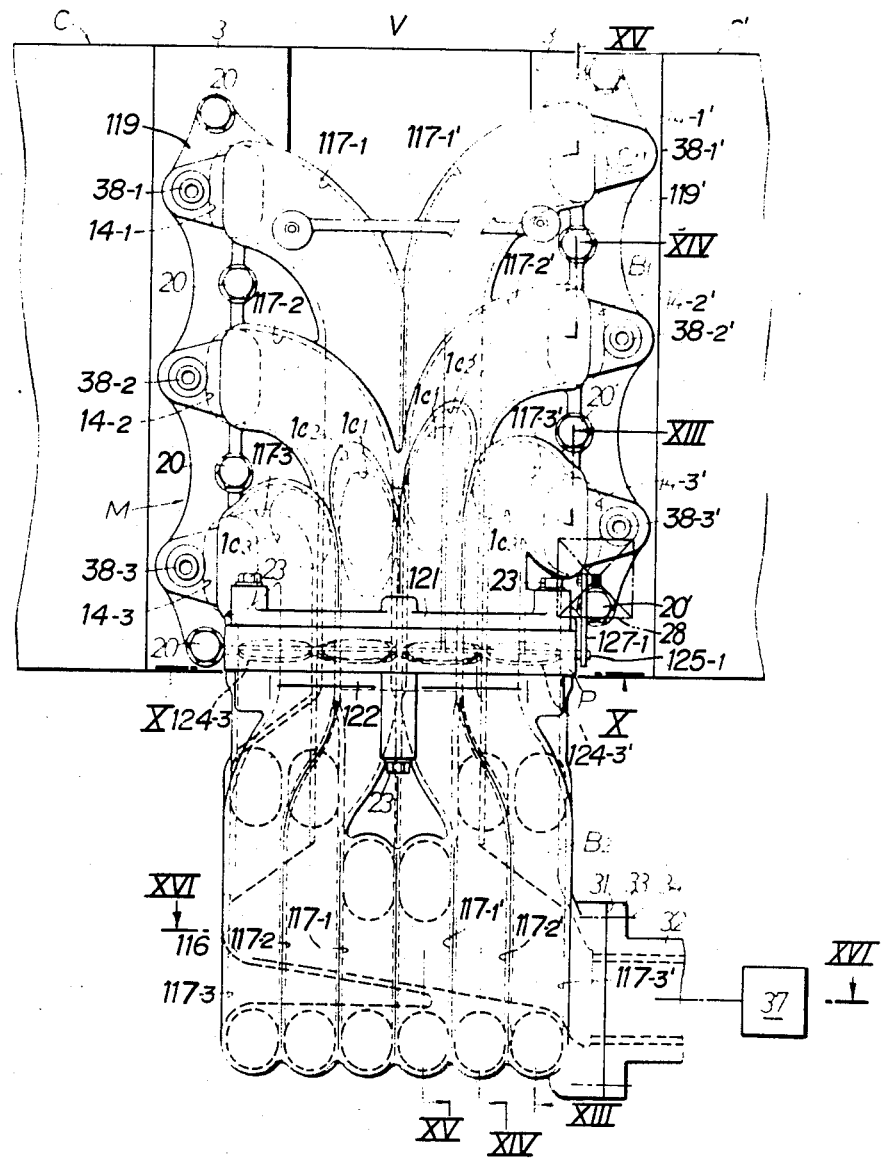
FIG. 11 is a top plan view similar to FIG. 2 and illustrating the second embodiment of the intake manifold system.
Figure 16:
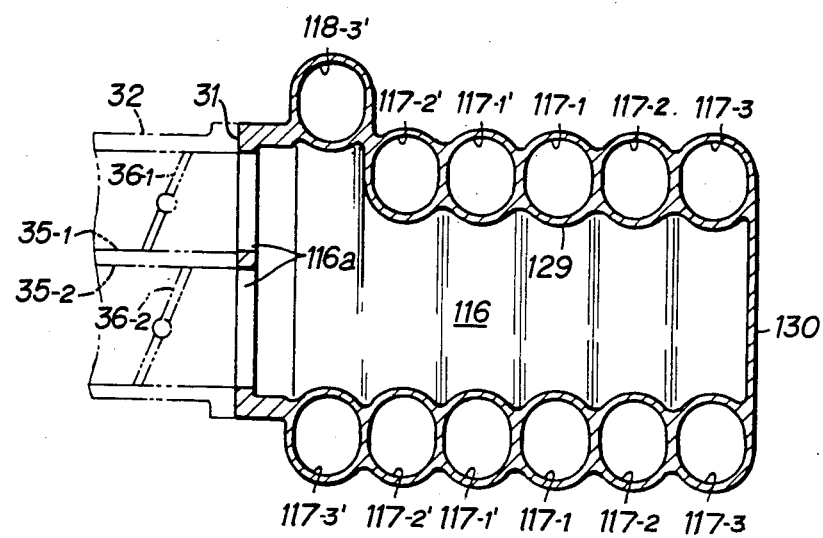
FIG. 16 is a sectional end view of the second embodiment of the intake manifold system taken substantially on the Line XVI—XVI in FIG. 11.

The internal combustion engine shown in FIGS. 1 and 10 are a V-shaped six cylinder engine in which three cylinders 1 are arrayed in the axial direction (i.e., in the direction normal to the paper surface of FIGS. 1 and 10) of a crankshaft (not shown) in two cylinder rows C and C' arranged in a transverse shape of letter "V". The engine may have more or fewer than three cylinders on each side without departing from this invention.

Since the two cylinder rows C and C' have generally symmetrical constructions, the following description will be limited to the construction of the cylinder row C at the lefthand side which is the same in FIGS. 1 and 10. A cylinder head 3 is fastened through a gasket 4 on the head of a cylinder block 2 which is formed with the cylinder 1. A piston 5 is slidably fitted in the cylinder 1 so that a combustion chamber 6 is formed in the bottom of the cylinder head 3 facing that piston 5.

Figure 9:
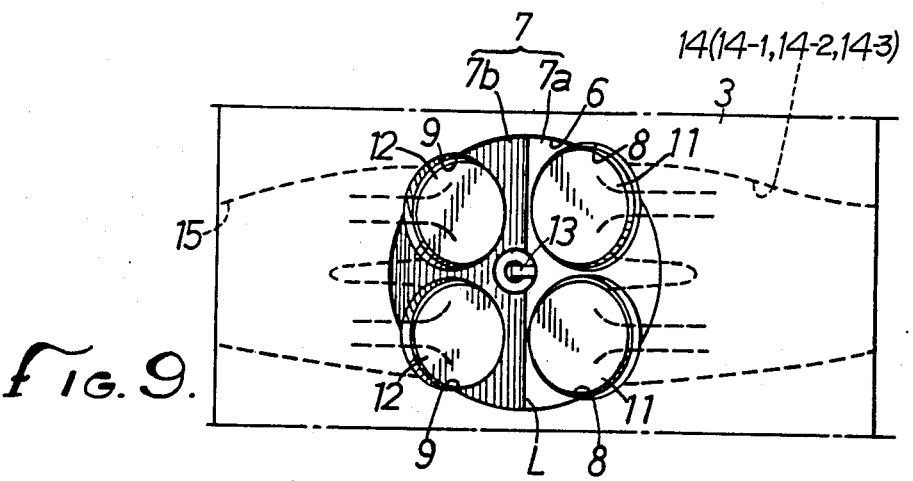
FIG. 9 is a fragmentary bottom view of the cylinder head illustrating a preferred arrangement of the valves and combustion chamber.

The combustion chamber 6 has its ceiling face 7 composed of two ceiling slopes 7a and 7b which extend downward to the right and left from a ridgeline L extending in the general direction of the three cylinders 1 (as shown in FIG. 9). The slope 7a located on the side adjacent the valley V between the two cylinder rows C and C' is formed with a pair of intake valve ports 8 whereas the opposed slope 7b is formed with a pair of exhaust valve ports 9 such that the intake valve ports 8 and the exhaust valve ports 9 are opened therein and juxtaposed to each other along the ridgeline L. The intake valve ports 8 and the exhaust valve ports 9 thus formed are opened and closed, respectively, by a pair of intake valves 11 and a pair of exhaust valves 12, both of which are adapted to be driven by a valve actuator mechanism 10. A single ignition plug 13 surrounded by those four valves 11, 11, 12 and 12 is screwed into the cylinder head 3 such that its electrode is positioned to face the central portion of the ceiling face 7 of the combustion chamber 6. The afore-described combustion chamber and valve arrangement is preferred but forms no part of the present invention and it is to be understood that other arrangements may be used with this invention.

The respectively paired intake valve ports 8 and exhaust valve ports 9 lead to their common intake port 14 and exhaust port 15, respectively. The intake port 14 has its entrance opened in the upper face of the cylinder head 3 at one side adjacent to the valley V whereas the exhaust port 15 has its exit opened in the other side of the cylinder head 3.

Figure 2:
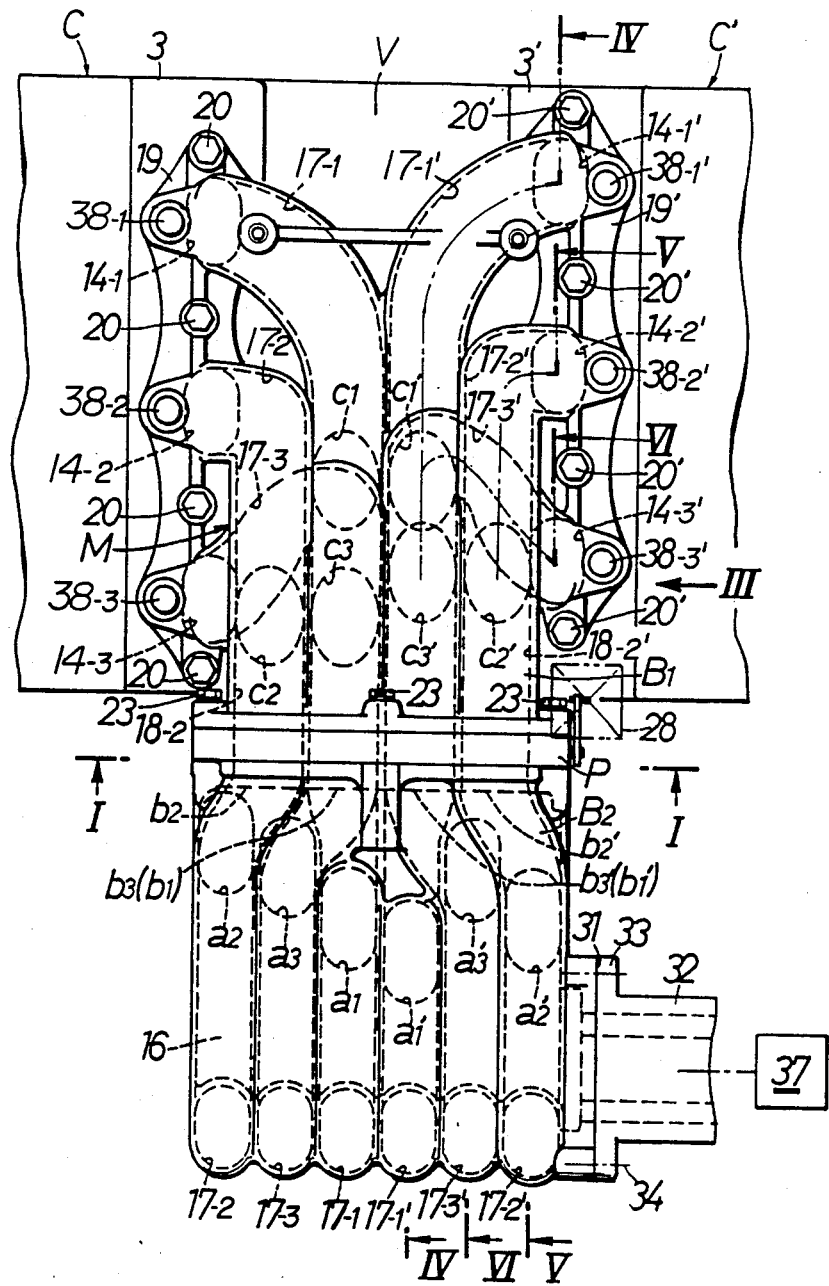
FIG. 2 is a top plan view of the intake manifold system of this invention.
Figure 7:
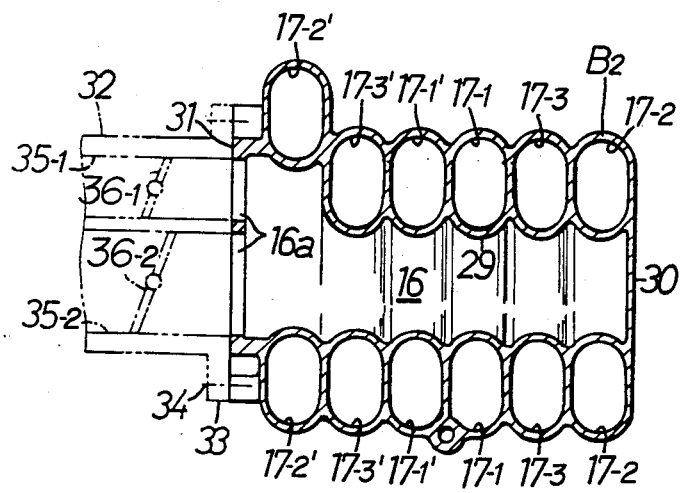
FIGS. 7 and 8 are sectional end views of portions of the intake manifold system taken substantially on the Lines VII—VII and VIII—VIII in FIG. 3.

As shown in FIG. 2, the three intake ports of the lefthand cylinder row C are called first, second and third intake ports 14-1, 14-2 and 14-3 in the order from the top whereas the three intake ports of the righthand cylinder row C' are called first, second and third intake ports 14-1', 14-2' and 14-3' likewise in the order from the top. An intake manifold M for distributing and supplying intake air or mixture to those intake ports is positioned in the valley V.

This intake manifold M is composed, as shown in FIGS. 2 to 8, of: one common intake distribution chamber 16; first to third intake passages 17-1 to 17-3 at the lefthand side, which lead from one side of the distribution chamber 16 to the first to third intake ports 14-1 to 14-3 at the lefthand side, respectively; first to third bypasses 18-1 to 18-3 at the lefthand side, which lead from the other side of the intake distribution chamber 16 and open into the individual intermediate portions of the first to third intake passages 17-1 to 17-3 at the lefthand side, respectively; first to third intake passages 17-1' to 17-3' at the righthand side, which lead from one side of the intake distribution chamber 16 to the first to third intake ports 14-1' to 14-3' at the righthand side, respectively; and first to third bypasses 18-1' to 18-3' at the righthand side, which lead from the other side of the intake distribution chamber 16 to the individual intermediate portions of the first to third intake passages 17-1' to 17-3' at the righthand side, respectively.

In order to facilitate machining, assembly and maintenance, the intake manifold M is divided into three portions, i.e., a first block B1 arranged in the valley V, a second block B2 arranged at one outer side of the valley V, and an intermediate plate P sandwiched between the two blocks B1 and B2. The first block B1 is integrally formed in a manner to correspond to the left and right cylinder rows C and C' with a pair of horizontal mounting flanges 19 and 19', which are fixed to the cylinder heads 3 and 3' of the individual cylinder rows C and C', respectively, by means of a plurality of bolts 20 and 20'. The first and second blocks B1 and B2 are integrally formed on their opposed ends with connecting flanges 21 and 22, which are fastened to each other through the intermediate plate P by means of a plurality of bolts 23.

The aforementioned intake distribution chamber 16 is formed in the second block B2 in a horizontal direction perpendicular to the crankshaft having as its fundamental shape a cylinder longer than the maximum width of the valley V. As shown in FIGS. 1, 2 and 4, the first intake passages 17-1 and 17-1' leading to the first intake ports 14-1 and 14-1' at the remotest position from the intake distribution chamber 16 are juxtaposed to each other at the central portion of the valley V such that they extend through the lower portion of the first block B1, through the intermediate plate P, and turn upward from below the distribution chamber 16 until they open into the upper face of said chamber 16. The first bypasses 18-1 and 18-1' are branched from the intermediate portions of the corresponding first intake passages 17-1 and 17-1' in the first block B1 such that they extend thereabove through the intermediate plate P until they open into the distribution chamber 16. As shown in FIGS. 1, 2 and 6, the third intake passages 17-3 and 17-3' are juxtaposed to each other at the central portion of the valley V such that they extend through the upper portion of the first block B1, through the intermediate plate P, and then turn downward from above the distribution chamber 16 until they open into the lower face of said chamber 16. The third bypasses 18-3 and 18-3' are branched from the intermediate portions of the corresponding third intake passages 17-3 and 17-3' in the first block B1 such that they extend therebelow through the intermediate plate P until they open into the distribution chamber 16. As shown in FIGS. 1, 2 and 5, the second intake passages 17-2 and 17-2' are arranged adjacent to the right and left sides of the third intake passages 17-3 and 17-3' such that they extend through the upper portion of the first block B1, through the intermediate plate P, and then turn downward from above the distribution chamber 16 until they open into the lower face of said chamber 16. The second bypasses 18-2 and 18-2' are branched from the intermediate portions of the corresponding second intake passages 17-2 and 17-2' in the first block B1 such that they extend therebelow through the intermediate plate P until they open into the distribution chamber 16. The effective sectional areas of the intake passages and bypasses thus far described are made substantially equal.

Thus, the first to third intake passages 17-1 to 17-3 and 17-1' to 17-3' and the first to third bypasses 18-1 to 18-3 and 18-1' to 18-3' are so arranged as a whole as to extend in the longitudinal direction of the valley V, and the individual intake passages 17-1 to 17-3 and 17-1' to 17-3' are provided with a very long first effective conduit length from their entrances a1 to a3 and a1' to a3' to the corresponding intake valve ports 8 to enhance the charging efficiency by the inertial effect of the intake air during slow speed running of the engine whereas the individual bypasses 18-1 to 18-3 and 18-1' to 18-3' are provided with a relatively short second effective intake conduit length from their entrances b1 to b3 and b1' to b3' to the corresponding intake valve ports 8 through the junctions c1 to c3 and c1' to c3' between the bypasses and the intake passages to enhance the charging efficiency by the inertial effect of the intake air during high speed running of the engine.

As better shown in FIG. 1, the intake passages and the bypasses are arrayed on the intermediate plate P by the construction described above. On the uppermost level, the second intake passage 17-2 at the lefthand side, the third intake passage 17-3 at the same side, the third intake passage 17-3' at the righthand side, and the second intake passage 17-2' at the same side are positioned in the recited order from the left. On the second level, the second bypass 18-2 at the lefthand side, the third bypass 18-3 at the same side, the third bypass 18-3' at the righthand side, and the second bypass 18-2' at the same side are positioned in the recited order from the left. On the third level, the first bypass 18-1 is at the lefthand side and the first bypass 18-1' is at the righthand side. On the lower most level, the first intake passage 17-1 is at the lefthand side and the first intake passage 17-1' is at the righthand side.

In the intermediate plate P, there are pivotally mounted butterfly type control valves 24-1 to 24-3 and 24-1' to 24-3' for opening or closing the first to third bypasses 18-1 to 18-3 and 18-1' to 18-3', respectively. The four control valves 24-2, 24-3, 24-3' and 24-2', on the upper level are borne on a long first valve shaft 25-1 whereas the two control valves 24-1 and 24-1' on the lower level are borne on a shorter second valve shaft 25-2. These two valve shafts 25-1 and 25-2 are provided with actuating levers 26-1 and 26-2 at their outer ends, respectively. Those actuating levers 26-1 and 26-2 are connected through a cooperation link 27 to each other and to an actuator 28 which is responsive to a predetermined high r.p.m. condition of the engine. With the construction thus far described, it is possible to concentrate and arrange the plural control valves without any interference with all the intake passages thereby to simplify the control mechanism for opening or closing the control valves, and it is also possible to construct an assembly of the intermediate plate and the control valves thereby to improve the assembling characteristics as a whole.

A variety of types of devices, such as a vacuum type or an electromagnetic type, can be used as that actuator 28. In the case of a vacuum type actuator, it should be constructed such that the aforementioned control valves are closed by the boost vacuum of the engine and are opened by the force of a spring.

All the six intake passages 17-1 to 17-3 and 17-1' to 17-3' are positioned around and in the axial direction of the intake distribution chamber 16 and are coupled to share their partition walls. The positioning in block B2 from left to right in FIG. 2 is in the order of the second intake passage 17-2 at the lefthand side, the third intake passage 17-3, the first intake passage 17-1, the first intake passage 17-1', the third intake passage 17-3', and the second intake passage 17-2' at the righthand side.

Figure 8:
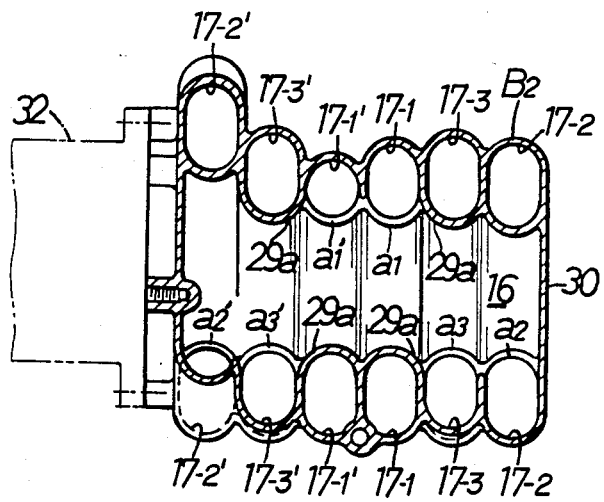

As shown in FIG. 8, the intake distribution chamber 16 is defined by both a corrugated inner peripheral wall 29, which is shared among the aforementioned six intake passages surrounding the distribution chamber 16, and a closed end wall 30 which is continuously formed at one end of that inner peripheral wall 29.

Since the intake distribution chamber 16 is defined by that corrugated inner peripheral wall 29, the entrances a1 to a3 and a1' to a3' of the individual intake passages opening into said chamber 16 are formed with air horns by the bulging wall 29a adjacent thereto for reducing the intake resistance. As a result, the distribution chamber 16 need not be specially formed with the air horns.

The other end of the intake distribution chamber 16 is open at its entrance 16a, around which is formed a mounting face 31. To this mounting face 31 there is fastened by means of bolts 34 the mounting flange 33 of a throttle valve cylinder 32. This throttle valve cylinder 32 is formed with primary and secondary intake passages 35-1 and 35-2 which commonly lead to the distribution chamber 16. The primary intake passage 35-1 is provided with a primary throttle valve 36-1 whereas the secondary intake passage 35-2 is provided with a secondary throttle valve 36-2. An air cleaner 37 (shown diagrammatically in FIG. 2) is disposed in the entrance of the throttle valve cylinder 32.

As best seen in FIGS. 1 and 2, the mounting flanges 19 and 19' of the first block B1 of the intake manifold M are provided with fuel injection nozzles 38-1 to 38-3 and 38-1' to 38-3' for injecting a fuel into the individual intake ports 14-1 to 14-3 and 14-1' to 14-3'.

The operation of this first embodiment will be described in the following. During slow speed running of the engine, the actuator 28 is in its inoperative state to close the control valves 24-1 to 24-3 and 24-1' to 24-3' thereby blocking all the bypasses 18-1 to 18-3 and 18-1' to 18-3'. As a result, the air, which is cleaned by the air cleaner 37 and sucked into the primary intake passage 35-1 (and the secondary intake passage 35-2) in accordance with the suction stroke of the engine, flows at a rate controlled by the primary throttle valve 36-1 (and the secondary throttle valve 36-2) into the intake distribution chamber 16 from which it is distributed into the six intake passages 17-1 to 17-3 and 17-1' to 17-3' until it is sucked through the intake ports 14-1 to 14-3 and 14-1' to 14-3' into the corresponding cylinders 1. The fuel is injected from the fuel injection nozzles 38-1 to 38-3 and 38-1' to 38-3' into the intake ports 14-1 to 14-3 and 14-1' to 14-3' so that fuel is supplied together with the aforementioned air into the individual cylinders 1.

The effective conduit length from the entrances a1 to a3 and a1' to a3' of the individual intake passages to the respective corresponding intake valve ports 8 is selected as a relatively long value to sufficiently enhance the charging efficiency by the inertial effect of the intake air during the slow speed running of the engine so that the output performance at the low speed of the engine can be satisfied.

Although the individual intake passages 17-1 to 17-3 and 17-1' to 17-3' have relatively long effective conduit lengths, they are arranged in the longitudinal direction of the valley V and formed to surround the intake distribution chamber 16 so that the intake manifold M is relatively compact as a whole to reduce its protrusion from the valley V between the two cylinder rows C and C' or too far beyond the end of the engine.

When the engine is operated above a predetermined fast running state, the actuator 28 operates to open the control valves 24-1 to 24-3 and 24-1' to 24-3' thereby to open all the bypasses 18-1 to 18-3 and 18-1' to 18-3'. Then, during the suction stroke of the engine, the air in the intake distribution chamber 16 is distributed not only into the six intake passages 17-1 to 17-3 and 17-1' to 17-3' but also into the six bypasses 18-1 to 18-3 and 18-1' to 18-3', and the air having passed through those bypasses merges midway through the corresponding intake passages into the air flowing through the same intake passages. The air then flows through the same passages as those of the slow running condition until it is sucked together with the injected fuel from the nozzles 38-1 to 38-3 and 38-1' to 38-3' into the individual cylinders 1.

When the bypasses 18-1 to 18-3 and 18-1' to 18-3' are opened to conduct air, they become dominant as the intake conduit length at the upstream side because they have shorter conduit lengths and accordingly smaller intake resistances than the intake passages upstream of their junctions c1 to c3 and c1' to c3' with the intake passages. As a result, the effective conduit lengths of the intake passages 17-1 to 17-3 and 17-1' to 17-3' are shortened to the conduit lengths from the entrances b1 to b3 and b1' to b3' of the bypasses to the corresponding intake valve ports 8. As has been described hereinbefore, the effective conduit lengths are selected to such values as will enhance the charging efficiency the best by the inertial effect of the intake air during the predetermined fast speed running of the engine so that the output performance at the high speed of the engine can be satisfied.

Incidentally, a carburetor system can be adopted as the fuel supply system in the present invention. In this case, the throttle valve cylinder 32 is replaced by a carburetor and the fuel injection nozzles 38-1 to 38-3 and 38-1' to 38-3' are omitted.

Referring now to the second embodiment shown in FIGS. 10-16, all of the operative components of the engine and the intake manifold system are the same as in the first embodiment and will not be redescribed. The only differences in the second embodiment are the size and shape of the intake passages 17 and 117 and bypass passages 18 and 118. In both embodiments the intake or slow-run passages 17 and 117 extend from and curve around the distribution chamber 16 and 116 in the same pattern to each of the six intake ports 14. However, in the second embodiment, the bypass or fast run passage 118 extends from the distribution chamber 116 straight to the intake port 14 and the intake or slow-run passage 117 is branched from the intersection or junction C in the downstream portion of the bypass 118. This produces a higher flow velocity for improving intake air charging efficiency during the predetermined fast running state of engine. Moreover, in the second embodiment the upstream portions of the intake passages 117-1 to 117-3 and 117-1' to 117-3' are of a smaller diameter than the bypass passages 118. This permits the passages from chamber 116 to the intake ports 14 for fast running to be of a maximum possible diameter without increasing the size of the manifold and to produce a slightly higher velocity in the slow-run passages 117 than passages 17 in the first embodiment for improved air charging efficiency.

The second embodiment has the entrance ends 1b of the bypass passages 118 precisely located in chamber 116 to provide the optimum length of this bypass or fast-run passages from that chamber 116 to the respective intake ports 14. Thus, as shown in FIGS. 13, 14 and 15, the entrance ends 1b3 and 1b3' of the passages 118-3 and 118-3' leading to the first (closest) intake ports 14-3 and 14-3' protrude a substantial distance into the distribution chamber 116 to create a longer passage length in shorter overall length of the manifold. Similarly, the entrance ends 1b2 and 1b2' extend a short distance into chamber 116 and entrance ends 1b1 and 1b1' do not extend into chamber 116 whereby the effective passage lengths for all six cylinders is the same and essentially the same as in the first embodiment although the overall length of intake manifold M is less.

As has been described hereinbefore, the intake manifold according to the present invention comprises a plurality of independent intake passages connected to intake ports, which lead to the cylinders of the individual cylinder rows, such that they merge into one another in a valley defined by the two cylinder rows and extend outwardly of said valley along the axis of said crankshaft; and an intake distribution chamber juxtaposed to said valley with openings therein for the entrances of the individual intake passages. As a result, the valley between the two cylinder rows can be effectively used to arrange the plural intake passages having the desired lengths and to arrange the intake distribution chamber having the desired volume without being restricted by the aforementioned valley whereby the suction characteristics of the engine can be freely established. Moreover, the intake passages and the intake distribution chamber can contribute to the compactness of the engine without considerably increasing the overall height of the engine. Two separate intake passages are provided for each cylinder with a valve operable in response to engine speed to cause the intake air to follow a relatively long passage at slow engine speeds thereby enhancing the inertial charging effect and opening shorter passages at high speeds to optimize engine operation.

Although we have fully described the invention in connection with two specific embodiments, it is to be understood that the invention is not limited to those embodiments.

The invention claimed is:

1. An intake manifold for a multi-cylinder internal combustion engine having at least one row of cylinders with intake ports aligned in a longitudinal direction, comprising, a plurality of separate intake passages with one such passage connected to each intake port, said intake passages extending generally longitudinally in one direction from the intake ports with portions extending beyond a plane defining a side end of the engine and being curved about a laterally extending axis substantially perpendicular to said longitudinal direction located beyond the plane defining said side end of the engine, wall means cooperating with said curved portions of said intake passages to form an intake air distribution chamber, each intake passage having an upstream end open into said distribution chamber, a separate bypass passage extending from an intersection with each said intake passage at a downstream portion thereof to said distribution chamber and being of a shorter length than an upstream portion of that intake passage from said intersection to said upstream end, and valve means for selectively opening and closing said bypass passages.

2. The intake manifold of claim 1 wherein at least two of said intake passages have said curved portions curving upwardly and at least another two of said intake passages have said curved portions curving downwardly.

3. The intake manifold of claim 1 wherein said curved intake passage portions forming said distribution chamber have a generally round cross-section and are immediately adjacent each other, and said upstream ends of each intake passage being cut away from the cross-section to cooperate with the round cross-sections of adjacent intake passages to form shaped inlet horns.

4. The intake manifold of claim 1 wherein said distribution chamber is generally cylindrical with a laterally extending axis.

5. The intake manifold of claim 1 wherein said distribution chamber is provided with an inlet opening on one lateral side, and throttle valve means for controlling air flow into the engine are provided immediately upstream of said inlet opening.

6. The intake manifold of claim 1 comprised of three sections, a first section mounted on the engine and communicating with the intake ports, a second section mounted on the first section and including a portion of said bypass passages and said valve means for selectively opening and closing said bypass passages, and a third section including said distribution chamber.

7. The intake manifold of claim 6 wherein said second section comprises a plate with ports therethrough and connected between said first and third sections, and said valve means comprise butterfly valves pivotally mounted in said plate ports.

8. The intake manifold of claim 7 wherein a plate port is provided for each separate intake passage and bypass passage, and said butterfly valves are pivotally mounted in each bypass passage port.

9. The intake manifold of claim 8 wherein plural bypass passage ports are positioned horizontally side-by-side and a single horizontal pivot shaft supports plural butterfly valves.

10. The intake manifold of claim 1 wherein said valve means includes a butterfly valve pivotally mounted in each bypass passage.

11. The intake manifold of claim 1 wherein means responsive to engine speed are provided for operating said valve means to open the bypass passages at high engine speeds and close the bypass passages at low engine speeds.

12. The intake manifold of claim 1 wherein said upstream end of each intake passage is located such that all the intake passages have effective lengths from the upstream end to the engine intake port that are substantially equal.

13. The intake manifold of claim 1 wherein each bypass passage has substantially equal effective lengths from said distribution chamber to the engine intake port.

14. The intake manifold of claim 1 wherein each said intake passage is of a smaller cross-sectional area than each said bypass passage.

15. An intake system as set forth in claim 1 wherein said intake manifold is divided into a first block arranged in said valley, a second block arraged outside of said valley, and an intermediate plate sandwiched between the two blocks, said intake passages and said bypasses being formed to extend through said first block and said intermediate plate and said control valves being mounted in said intermediate plate, and said intake distribution chamber being formed in said second block.

16. An intake system as set forth in claim 15 wherein the plural intake passages extending through said intermediate plate are arrayed in at least an upper level, middle level and lower level, wherein the plural bypasses extending through said intermediate plate are positioned in the middle level, and wherein said control valves are borne on valve shafts which are pivoted to said intermediate plate extending across only said bypasses.

17. An intake system as set forth in claim 15 wherein the intake passages for said two cylinder rows which lead to the intake ports that are most remote from the intake distribution chamber are formed to extend in a lower most portion of said first block through said intermediate plate and then to extend in said second block upward from below a central portion of said intake distribution chamber, wherein the bypasses connected to said intake passages are arranged above said intake passages and extend through said intermediate plate into said intake distribution chamber, wherein the intake passages of said two cylinder rows which lead to the intake ports the nearest to said intake distribution chamber are formed to extend in an uppermost portion of said first block through said intermediate plate and then to extend in said second block downward from above the two end portions of said intake distribution chamber and wherein the bypasses connected to the intermediate portions of said last-mentioned intake passages are arranged below said intake passages and extend through said intermediate plate into said intake distribution chamber.

18. An intake system as set forth in claim 1 wherein said intake distribution chamber is a cylindrical shape defined by inner peripheral walls of the plural intake passages which are positioned to surround said intake distribution chamber, and wherein said cylindrical intake distribution chamber has its entrance opened at its end face.

19. An intake system as set forth in claim 18 wherein each of said inner peripheral walls is corrugated, and wherein the entrances of said intake passages are opened in said intake distribution chamber adjacent to a bulging wall of said corrugated inner peripheral walls.

20. The intake manifold of claim 1 wherein said air distribution chamber is formed of a single integral block including said wall means and intake passage curved portions.

21. The intake manifold of claim 20 wherein said curved portions of adjacent intake passages have common wall means.

22. The intake manifold of claim 20 wherein said intake passage curved portions are generally oval in cross-section and have relatively uniform wall thicknesses whereby the interior surface forming said air distribution chamber is generally corrugated.

23. An intake manifold for a V-shaped multi-cylinder internal combustion engine in which a pair of cylinder rows each having a plurality of cylinders positioned in the axial direction of a crankshaft are arranged int he shape of the letter "V" with a valley therebetween, comprising, a plurality of independent intake passages with a separate intake passage portions connected to each of the intake ports which lead to the cylinders of the individual cylinder rows, said independent intake passages having walls that merge into one another in the valley defined by the two cylinder rows and extend outwardly beyond a plane defining a side end of said valley along the axial direction of said crankshaft, and the plurality of intake passages being curved about a lateral axis substantially perpendicular to said axial direction to form an intake distribution chamber juxtaposed to said valley beyond the plane defining said side end of the valley of said engine with openings therein for entrance into the independent intake passages.

24. An intake manifold as set forth in claim 23 wherein it is composed of at least two integral blocks connected to each other outside of said valley, and wherein said blocks arranged outside of said valley are formed with said distribution chamber.

25. An intake manifold for a multi-cylinder internal combustion engine having at least one row of cylinders with intake ports aligned in a longitudinal direction comprising, a plurality of separate intake passages with one such passage connected to each intake port, said intake passages extending generally longitudinally in one direction from the intake ports with portions extending beyond one end of the engine and being curved about a laterally extending axis, located beyond that one end of the engine wall means cooperating with said curved portions of said intake passages to form an air distribution chamber, each intake passage having an upstream end open into said distribtuion chamber, a separate bypass extending from an intersection with each said intake passage at a downstream portion thereof to said distribution chamber and being of a shorter length than an upstream portion of that intake passage from said intersection to said upstream end, and valve means for selectively opening and closing said bypass passages, the manifold being three sections, a first section mounted on the engine and communicating with the intake ports, a second section mounted on the first section and including a portion of said bypass passages and said valve means for selectively opening and closing said bypass passages, and a third section including said distribution chamber, and wherein said second section includes a plate with ports there through and connected between said first and thid sections, said valve means comprise butterfly valves pivotally mounted in said plate ports, a plate port being provided for each separate intake passage and bypass passage, and said butterfly valves are pivotally mounted in each bypass passage port.

26. The intake manifold of claim 25 wherein plural bypass passage ports are positioned horizontally side-by-side and a single horizonal pivot shaft supports plural butterfly valves.

27. An intake system for V-shaped multi-cylinder internal combustion engine in which a pair of cylinder rows each having a plurality of cylinders positioned in the axial direction of a crankshaft are arranged in the shape of letter "V", comprising, a plurality of independent intake passages connected to a plurality of intake ports of the individual cylinder rows such that they merge into one another in a valley defined by the two cylinder rows and extend outwardly of said valley along the axis of said crankshaft, an intake distribution chamber juxtaposed to said valley at one end of the engine with openings therein for entrances into said individual intake passages and a plurality of bypasses connecting said intake distribution chamber and said plural intake passages downstream of said entrances, said individual bypasses being provided with control valves for opening and closing said bypasses, and an actuator connected to said control valves for opening said control valves in response to a predetermined fast running state of said engine, wherein said intake manifold is divided into a first block arranged in said valley, a second block arranged outside of said valley, and an intermediate plate sandwiched between the two blocks, said intake pasasges and said bypasses being formed to extend through said first block and said intermediate plate and said control valves being mounted in said intermediate plate, and said intake distribution chamber being formed in said second block, wherein the plural intake passages extending through said intermediate plate are arrayed in at least an upper level, middle level and lower level, wherein the plural bypasses extending through said intermediate plate are positioned in the middle level, and wherein said control valves are borne on valve shafts which are pivoted to said intermediate plate extending across only said bypasses, wherein the intake passages for said two cylinder rows which lead to the intake ports that are most remote from the intake distribution chamber are formed to extend in a lower most portion of said first block through said intermediate plate and then to extend in said second block upward from below a central portion of said intake distribution chamber, wherein the bypasses connected to said intake passages are arranged above said intake passages and extend through said intermediate plate into said intake distribution chamber, wherein the intake passages of said two cylinder rows which lead to the intake ports the nearest to said intake distribution chamber are formed to extend in an uppermost portion of said first block through said intermediate plate and then to extend in said second block downward from above the two end portions of said intake distribution chamber and wherein the bypasses connected to the intermediate portions of said last-mentioned intake passages are arranged below said intake passages and extend through said intermediate plate into said intake distribution chamber.

* * * * *